United States Patent

Wallace et al.

[11] Patent Number: 5,329,347
[45] Date of Patent: Jul. 12, 1994

[54] MULTIFUNCTION COAXIAL OBJECTIVE SYSTEM FOR A RANGEFINDER

[75] Inventors: Robert E. Wallace, Garland; Wayne E. Isbell, Dallas, both of Tex.

[73] Assignee: Varo Inc., Garland, Tex.

[21] Appl. No.: 945,743

[22] Filed: Sep. 16, 1992

[51] Int. Cl.⁵ .......................... G01C 3/08; H01J 31/50; G02B 21/06
[52] U.S. Cl. .......................... 356/5; 250/213; 359/211; 359/389; 359/425; 359/426
[58] Field of Search .................. 356/5; 359/211, 389, 359/425, 426; 250/213

[56] References Cited

U.S. PATENT DOCUMENTS

| | | |
|---|---|---|
| 2,953,059 | 9/1960 | Rodman et al. |
| 3,614,449 | 10/1971 | Ward, III .......................... 250/216 |
| 3,671,127 | 6/1972 | Odone et al. ....................... 356/4 |
| 3,698,812 | 10/1972 | Nelson ................................ 356/5 |
| 3,761,714 | 9/1973 | Fernandez et al. ................ 250/348 |
| 3,941,999 | 3/1976 | Moyers ............................... 250/201 |
| 4,091,412 | 5/1978 | Salonimer ........................... 358/108 |
| 4,108,551 | 8/1978 | Weber ................................. 356/4 |
| 4,113,381 | 9/1978 | Epstein ............................... 356/5 |
| 4,165,936 | 8/1979 | Eisenring et al. ................. 356/5 |
| 4,465,366 | 8/1984 | Schmidt ............................. 356/1 |
| 4,504,143 | 3/1985 | Heinze et al. ...................... 356/5 |
| 4,713,544 | 12/1987 | Grage ............................... 250/334 |
| 4,902,128 | 2/1990 | Siebecker et al. .................. 356/152 |

Primary Examiner—Stephen C. Buczinski
Attorney, Agent, or Firm—Baker & Botts

[57] ABSTRACT

There is provided a multifunction coaxial objective system (16) for a laser rangefinder (10). The transmitter, receiver, and viewing optical systems have a common, coaxial optical axis (48). The multifunction coaxial objective system (16) includes lenses (28), (30) and mirror (32) each having a central obscuration therein. The multifunction coaxial objective system (16) further includes a lens (34) having a dichroic coating on one surface (50). The dichroic coated lens (34) transmits visible and near infrared light and reflects light of the wavelength transmitted by a laser emitter (18). The viewing optical system includes a pair of focusing wedges (42), (44) for adjusting the focus of the viewing optical system. Each focusing wedge (42), (44) is a wedge-shaped optical flat. The pair of focusing wedges (42), (44) are disposed against one another along a plane inclined with respect to the coaxial optical axis (48) of the multifunction coaxial objective system (16). Focus adjustment is achieved by relative movement between the focusing wedges (42), (44) along the inclined plane. The multifunction coaxial objective system (16) of the present invention may alternatively be incorporated into a rangefinder and camera for example.

33 Claims, 1 Drawing Sheet

MULTIFUNCTION COAXIAL OBJECTIVE SYSTEM FOR A RANGEFINDER

TECHNICAL FIELD OF THE INVENTION

The present invention relates to optical systems and, more particularly to an improved optical system for a laser rangefinder having coaxial viewing, transmitting, and receiving channels.

BACKGROUND OF THE INVENTION

Laser rangefinders are well known in the rangefinding art. A laser rangefinder emits one or more laser pulses toward an object the range of which is to be determined. The laser pulses reflect from the object back to the rangefinder, and are detected by a laser detector. The length of time between emission of each laser pulse and its detection by the laser detector is measured by a timer clock, and the range is determined from this time period. A numerical range figure may be displayed on a suitable electronic display on the rangefinder, or may be printed on a remote paper printer, for example.

Typical laser rangefinders of the prior art have three separate optical channels: a channel for the transmitting optics, a channel for the receiving optics, and a channel for the viewing optics. Each of these optical channels typically has its own distinct optical axis. A few laser rangefinders have been designed in which the receiving and viewing channels are coaxial. However, there are no known laser rangefinders with coaxial transmitting, receiving and night viewing channels. Such a rangefinder having coaxial optics for all three functions is highly desirable for reducing size, weight, and cost of the rangefinder.

A second disadvantage with laser rangefinders of the prior art resides in the lens system for focusing the viewing optics. A typical focusing system requires relative movement between the viewing lens and the transmitter and receiver optics. This relative movement between the viewing and the rangefinder optics contributes to boresight loss, parallax, and alignment stability problems in the rangefinder.

Consequently, a need exists for a laser rangefinder with an improved optical system which uses a single optical channel for transmitting, receiving and viewing functions. Preferably, such an improved laser rangefinder will have an optical system which permits focus adjustment for the viewing system without relative movement between the viewing lens and the transmitter or receiver optics. Such an improved laser rangefinder will further preferably have night vision capability.

SUMMARY OF THE INVENTION

The present invention provides a laser rangefinder and night vision goggle having an improved optical system. The transmitter, receiver, and viewing optical systems have coaxial optical axes. The improved optical system includes at least one optical element having a central obscuration therein. The improved optical system further includes a lens having a dichroic coating on one surface for transmitting visible and near infrared light and for reflecting light of the wavelength transmitted by the laser emitter. The viewing optical system includes a pair of focusing wedges for adjusting the focus of the viewing optical system. Each focusing wedge is a wedge-shaped optical flat, the pair of focusing wedges being disposed against one another along a plane inclined with respect to the optical axis of the viewing optical system, whereby focus adjustment is achieved by relative movement between the focusing wedges along the inclined plane.

DETAILED DESCRIPTION OF THE INVENTION

Figure 1:
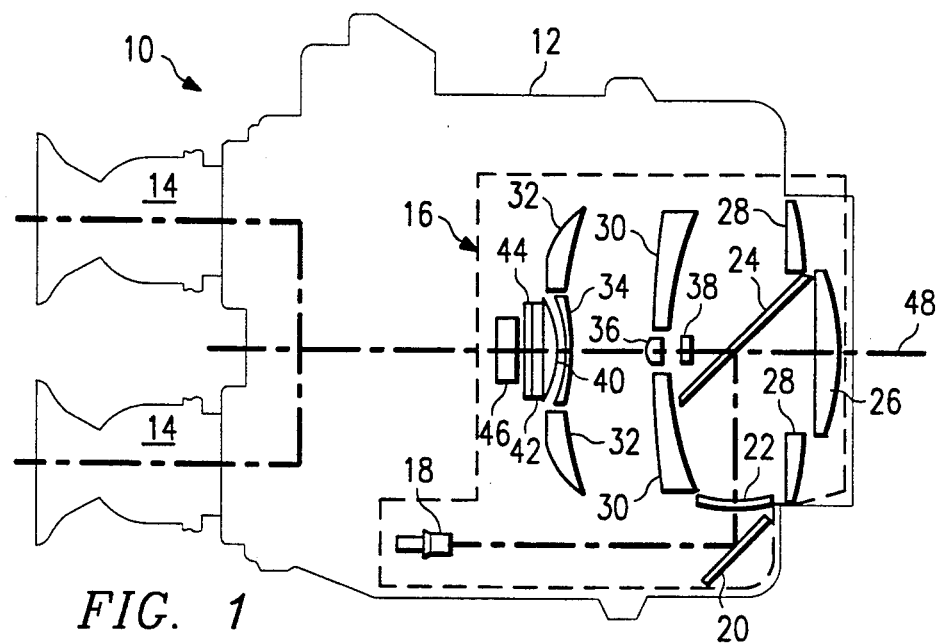
FIG. 1 is a top, cross-sectional schematic view of a laser rangefinder and night vision goggle of the present invention.

The preferred embodiment of the present invention and its advantages are best understood by referring to the drawings, like numerals being used for like and corresponding parts of the various drawings.

Referring now to the drawings, and more particularly to FIG. 1, there is shown a top, cross-sectional view of a laser rangefinder and night vision goggle, generally designated 10, which incorporates the preferred embodiment of the present invention. Rangefinder and night vision goggle 10 comprises a housing 12 having on its rear a pair of eyepieces 14. The front portion of housing 12 contains the improved optical system or multifunction coaxial objective system, generally designated 16, of the present invention. Improved optical system 16 includes a transmitter optical system, a receiver optical system, and a viewing or imaging optical system.

The transmitter optical system includes laser emitter 18, folding mirror 20, lens 22, folding mirror 24, and lens 26. Laser emitter 18 is preferably a triple emitting region, pulsed output, semiconductor laser diode. The preferred commercially available laser diode that may be used for laser emitter 18 is the EG&G Model C86091E which emits laser energy of 1.55 $\mu$m wavelength. Alternatively, the Stantel LE Series Type LE25-02 diode, having a 905 nm pulsed output, may be used for emitter 18. Mirrors 20 and 24 are commercially available, optical grade, flat mirrors which are well known in the art. The lens prescription and mounting distance data for lenses 22 and 26 are listed in Table I. Listed in order from left to right are: (1) the lens surface number; (2) the radius of curvature of the surface (mm) (positive (+) radii for centers of curvature to right of lens surface, and negative (−) radii for centers to left of surfaces); (3) the lens axial thickness, or distance to the next surface (mm); (4) the clear aperture radius (mm); and (5) the lens material.

TABLE I

| SURFACE NO. | RADIUS OF CURVATURE (mm) | THICKNESS (mm) | CLEAR APERTURE RADIUS (mm) | MATERIAL |
| --- | --- | --- | --- | --- |
| 93 | 70.75 | 5.73 | 22.0 | BK7 |
| 94 | ∞ | 74.83 | 21.7 | AIR |
| 95 | −41.32 | 3.10 | 9.5 | SFL6 |
| 96 | −68.89 | 110.82 | 9.5 | AIR |
| 97 | ∞ | — | — | AIR |

The receiver optical system includes lens 28, lens 30, mirror 32, lens 34, lens 36, and laser detector 38. Table II lists the preferred lens prescription and mounting distance data for the receiver optical system. Listed in order from left to right are: (1) the lens surface number; (2) the radius of curvature of the surface (mm) (positive (+) radii for centers of curvature to right of lens surface, and negative (−) radii for centers to left of surface); (3) the lens axial thickness, or distance to the next surface (mm); (4) the lens material; (5) the clear aperture radius (mm); and (6) the central obscuration radius (mm), if any.

TABLE II

| SURFACE NO. | RADIUS OF CURVATURE (mm) | THICKNESS (mm) | MATERIAL | CLEAR APERTURE RADIUS (mm) | CENTRAL OBSCURATION RADIUS (mm) |
|---|---|---|---|---|---|
| 62 | +192.5 | 7.733 | FK3 | 42.5 | 24.3 |
| 63 | −744.288 | 35.307 | AIR | 42.3 | 24.3 |
| 64 | −104.902 | 3.801 | FK3 | 38.5 | 22.8 |
| 65 | −358.443 | 29.843 | AIR | 38.8 | 22.9 |
| 66 | −136.934 | −29.843 | MIRROR | 39.0 | 17.5 |
| 67 | −358.443 | 27.024 | MIRROR | 22.9 | 6.8 |
| 88 | +77.00 | −25 | DICHROIC MIRROR | 9.4 | — |
| 89 | −8.467 | −3.987 | SF6 | 4.0 | — |
| 90 | ∞ | −4.268 | AIR | 3.0 | — |
| 91 | ∞ | 0 | DETECTOR | — | — |

The viewing optical system includes lens 28, lens 30, mirror 32, lens 34, lens 40, focusing wedges or optical flats 42 and 44, and image intensifier tube 46. Table III lists the preferred lens prescription and mounting distance data for the viewing optical system. Listed in order from left to right are: (1) the lens surface number; (2) the radius of curvature of the surface (mm) (positive (+) radii for centers of curvature to right of lens Surface, and negative (−) radii for centers to left of surface); (3) the lens axial thickness, or distance to the next surface (mm); (4) the lens material; (5) the clear aperture radius (mm); and (6) the central obscuration radius (mm), if any. Image intensifier tube 46 permits night vision when the present invention is incorporated in a night vision goggle.

TABLE III

| SURFACE NO. | RADIUS OF CURVATURE (mm) | THICKNESS (mm) | MATERIAL | CLEAR APERTURE RADIUS (mm) | CENTRAL OBSCURATION RADIUS (mm) |
|---|---|---|---|---|---|
| 62 | +192.5 | 7.733 | FK3 | 42.5 | 24.3 |
| 63 | −744.288 | 35.307 | AIR | 42.3 | 24.3 |
| 64 | −104.902 | 3.801 | FK3 | 38.5 | 22.8 |
| 65 | −358.443 | 29.843 | AIR | 38.8 | 22.9 |
| 66 | −136.934 | −29.843 | MIRROR | 39.0 | 17.5 |
| 67 | −358.443 | 27.024 | MIRROR | 22.9 | 6.8 |
| 68 | +77.00 | 1.935 | SFL6 | 15.3 | — |
| 69 | +47.533 | 1.277 | AIR | 14.7 | — |
| 70 | +31.893 | 5.054 | LaKL21 | 14.3 | — |
| 71 | −932.728 | 1.843 | AIR | 13.9 | — |
| 72 | ∞ | 2.5 | FK3 | 12.8 | — |
| 73 | ∞ | 0.05 | AIR | 12.3 WEDGE 3.81° | — |
| 75 | ∞ | 2.5 | FK3 | 12.3 | — |
| 76 | ∞ | 1.88 | AIR | 12.5 WEDGE 3.81° | — |
| 78 | ∞ | 5.46 | FK5 | 10.4 | — |
| 79 | ∞ | 0 | — | 9.0 IMAGE | — |

Figure 2:
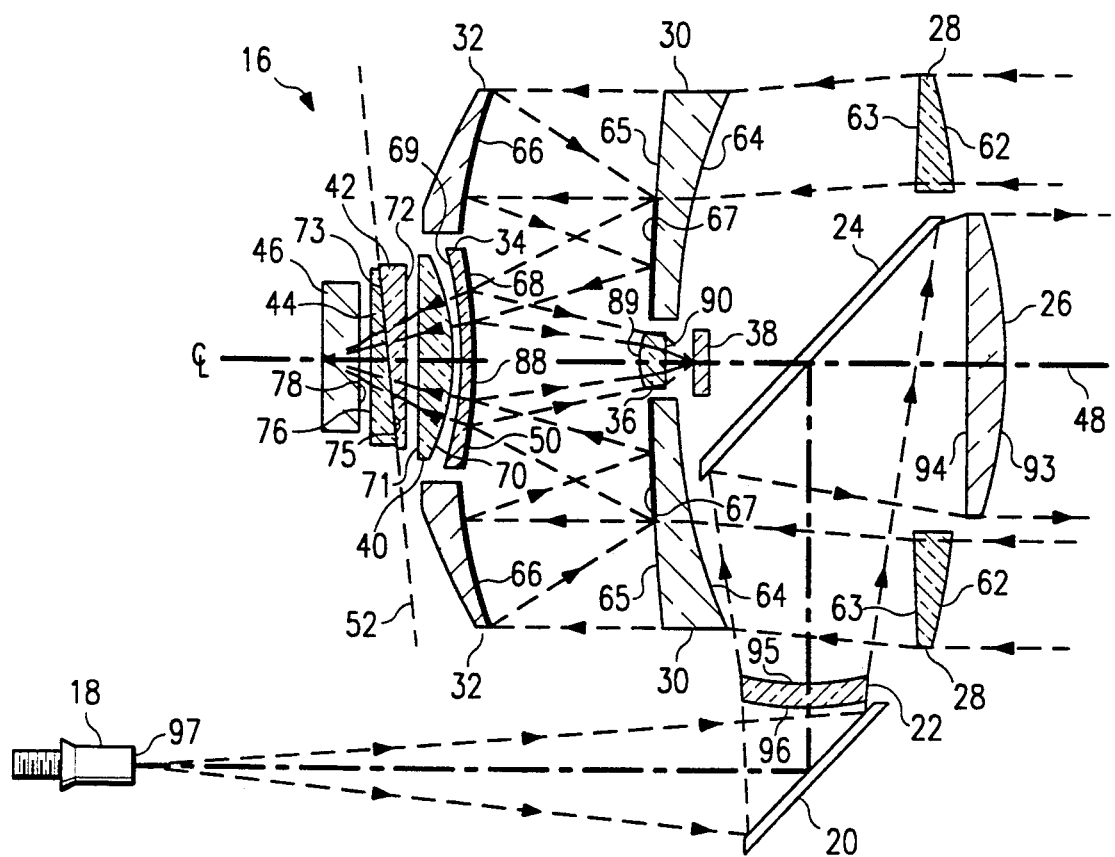
FIG. 2 is an enlarged schematic view of the improved optical system of the present invention, illustrating the path of representative rays through the optical system.

Referring now to FIG. 2, there is shown an enlarged, cross-sectional view of the improved optical system 16 of the present invention. One of the important features of this invention is that the transmitter, receiver, viewing optical systems are coaxial in object space, sharing a common optical axis 48. The innovative means by which all three of these optical systems have a common optical axis is another important feature of this invention, and is explained hereinafter.

As seen in FIG. 2, lenses 28 and 30 and mirror 32 together comprise the major part of a catadioptric lens system. A catadioptric lens system is one in which both reflecting and refracting elements are used to form its focal power. The central portions of these lenses and mirror are not used for imaging. This unused, central area of lenses 28 and 30 and mirror 32 is referred to as the central obscuration or centrally obscured region and is used instead for portions of the transmitter and/or receiver optical systems. The use of these optical elements having central obscurations therein constitutes an important feature of this invention. As seen in FIG. 2, laser energy transmitted by laser emitter 18 passes through the central obscuration of lens 28. Laser energy received by lens 28 focuses to laser detector 38 situated within the central obscuration of lens 30. Finally, the visible image produced by the viewing optical system passes through the central obscuration of mirror 32. Thus, the central obscuration of each of lenses 28 and 30 and mirror 32 are used by a different optical system of the present invention.

As seen in FIG. 2, lens 36 of the receiver optical system is located in the central obscuration of lens 30. Lens 34, used in both the viewing and receiving optical systems, and lens 40 of the viewing optical system, are located in the central obscuration of mirror 32. Lens 26 of the transmitting optical system is located adjacent to and within the centrally obscured region of lens 28. Laser detector 38 is located adjacent to lens 36, and within the centrally obscured region of lens 30.

It should be noted that the inner surface 67 of the side of lens 30 which faces lens 34 is mirror coated, whereas the outer surface 65 of this side of lens 30 is uncoated. Surface 67 of lens 30 is mirror coated to reflect light from mirror 32 to lens 34. Surface 65 of lens 30 is uncoated to permit light to pass through lens 30 to mirror 32.

A key aspect of this invention resides in the dichroic coating applied to side 50 of lens 34. The dichroic coating on side 50 of lens 34 transmits visible and near infrared light produced by the viewing optical system to the image intensifier tube 46, but reflects light or laser energy of the wavelength transmitted by the laser emitter 18 back to laser detector 38. Dichroic coated lens 34 thus performs a dual function as a short wavelength pass filter in transmitting visible and near infrared light for the viewing optical system and in reflecting laser energy for the receiver optical system.

The wavelength transmitted by the EG&G Model C86091E laser diode, the preferred choice for laser emitter 18, is 1.55 μm. Dichroic coatings suitable for this application are well known in the art, and are commercially available. Dichroic coated lens 34 is preferably located at least partially within the central obscuration of mirror 32. Alternatively, dichroic coated lens 34 may be located adjacent to and near the central obscuration of mirror 32.

FIG. 2 also illustrates another important feature of this invention: The viewing optical system includes a pair of focusing wedges 42 and 44 for adjusting the focus of visual images transmitted to image intensifier tube 46. Each focusing wedge 42 and 44 is a wedge-shaped optical flat. The two optical flats 42 and 44 are disposed against one another along a plane 52 which is inclined with respect to the common optical axis 48. Focus adjustment for the viewing optical system is achieved by relative movement between focusing wedges 42 and 44 along inclined plane 52. This relative movement changes the combined optical thickness of the pair of focusing wedges 42 and 44, thereby adjusting the focus of the viewing optical system.

The relative movement between focusing wedge 42 and 44 may be achieved by one of several alternative means. In the preferred embodiment, focusing wedges 42 and 44 are simultaneously moved along plane 52 in opposite directions by rotating a knob (not illustrated) attached to housing 12. The rotatable knob is attached to focusing wedges 42 and 44 through a suitable linkage (not illustrated). Alternatively, focusing wedges 42 and 44 may be moved along plane 52 in opposite directions by a pivotable lever (not illustrated) attached to housing 12. The pivotable lever is attached to focusing wedges 42 and 44 through a suitable linkage (not illustrated). Focus adjustment may also be achieved by moving only one of focusing wedges 42 or 44 along inclined plane 52, the other focusing wedge 42 or 44 being held stationary. For a handheld rangefinder, displacement of focusing wedge 42 or 44 by approximately ¾ inch would be sufficient to adjust the viewing system focus over the required range.

The improved optical system 16 of the present invention has been described and illustrated as it might be incorporated in a handheld laser rangefinder and night vision goggle or viewer. Although not illustrated or described in detail, an alternative embodiment of the improved optical system of the present invention might be a laser rangefinder and camera, for example. In this embodiment, a camera film plane would be substituted for the image plane of the image intensifier tube of the described embodiment. Still another embodiment of this invention might be a laser rangefinder alone. In this embodiment, only the coaxial transmitter and receiver optical systems would be included, without the viewing optical system. Such a rangefinder might be used in a motion detector for a security system, in an aircraft altitude sensor, or in a vehicle separation sensor.

The laser rangefinder multifunction coaxial objective system of the present invention, and many of its intended advantages, will be understood from the foregoing description and it will be apparent that, although the invention and its advantages have been described in detail, various changes, substitutions, and alternations may be made in the manner, procedure, and details thereof without departing from the spirit and scope of the invention, as defined by the appended claims, or sacrificing all of its material advantages. The form hereinbefore described being merely a preferred or exemplary embodiment thereof.

We claim:

1. An improved optical catadioptric lens system for a rangefinder suitable for use as part of a night vision goggles system, comprising:
a transmitter optical system having an optical axis;
a receiver optical system having an optical axis;
an image intensifier; and
a viewing optical system adapted for receiving an image from the image intensifier, the viewing optical system having an optical axis, wherein the optical axes of the transmitter optical system, the receiver optical system, and the viewing optical system are coaxial in object space.

2. The improved optical system of claim 1, wherein the viewing optical system includes a plurality of optical elements having central obscurations therein.

3. The improved optical system of claim 2, wherein a visible and near infrared image produced by the viewing optical system passes through the central obscuration of a first optical element of the plurality of optical elements.

4. The improved optical system of claim 2, wherein the rangefinder includes a laser emitter and a laser detector.

5. The improved optical system of claim 4, wherein the optical axis of the laser emitter of the rangefinder is offset with respect to the coaxial axis of the transmitter, receiver, and viewing optical system, and wherein the transmitter optical system includes at least one folding mirror for reflecting laser energy from the laser emitter into a path concentric with the coaxial axis of the transmitter, receiver, and viewing optical systems.

6. The improved optical system of claim 4, wherein laser energy transmitted by the laser emitter passes through the central obscuration of a second optical element of the plurality optical elements.

7. The improved optical system of claim 4, wherein laser energy received by the laser detector passes through the central obscuration of the optical element.

8. The improved optical system of claim 4, wherein the laser detector is located in the central obscuration of the optical element.

9. The improved optical system of claim 4, further including a lens having a dichroic coating on one surface for transmitting visible and near infrared light and for reflecting light of the wavelength transmitted by the laser emitter.

10. The improved optical system of claim 9, wherein the dichroic coated lens is located in the central obscuration of the optical element.

11. The improved optical system of claim 1, wherein the viewing optical system includes an image intensifier tube for permitting night vision.

12. The improved optical system of claim 1, wherein the viewing optical system includes a pair of focusing wedges for adjusting the focus of the viewing optical system.

13. The improved optical system of claim 12, wherein each focusing wedge is a wedge shaped optical flat, the pair of focusing wedges being disposed against one another along a plane inclined with respect to the optical axis of the viewing optical system, whereby focus adjustment is achieved by relative movement between the focusing wedges along the inclined plane.

14. The improved optical system of claim 13, further including means for moving at least one of the focusing wedges with respect to the other focusing wedge along the inclined plane for changing the optical thickness of the pair of focusing wedges, and thereby adjusting the focus of the viewing optical system.

15. The improved optical system of claim 14, further including a housing for supporting the improved optical system, and wherein the means for moving at least one of the focusing wedges with respect to the other focusing wedge is a rotatable knob attached to the housing.

16. The improved optical system of claim 14, further including a housing for supporting the improved optical system, and wherein the means for moving at least one of the focusing wedges with respect to the other focusing wedge is a pivotable lever attached to the housing.

17. An improved optical catadioptric lens system for a rangefinder suitable for use as part of a night vision goggles system, the improved system including a laser emitter and a laser detector, the improved optical system comprising:
   a viewing optical system;
   an image intensifier adapted for projecting an image to the viewing optical system for viewing;
   a transmitter optical system having an optical axis for transmitting laser energy from the laser emitter;
   a receiver optical system having an optical axis for permitting the laser detector to receive laser energy, wherein the optical axes of the transmitter optical system and the receiver optical system are coaxial in object space; and
   at least one optical element having a central obscuration therein included within the receiver optical system, wherein laser energy transmitted by the laser emitter passes through the central obscuration of the optical element.

18. The improved optical system of claim 17, wherein the optical axis of the laser emitter of the rangefinder is offset with respect to the coaxial axis of the transmitter and receiver optical systems, and wherein the transmitter optical system includes at least one folding mirror for reflecting laser energy from the laser emitter into a path concentric with the axis of the transmitter and receiver optical systems.

19. The improved optical system of claim 17, wherein laser energy received by the laser detector passes through the central obscuration of the optical element.

20. The improved optical system of claim 17, wherein the laser detector is located in the central obscuration of the optical element.

21. The improved optical system of claim 17, further including a viewing optical system having an optical axis, wherein the optical axes of the transmitter optical system, the receiver optical system, and the viewing optical system are coaxial in object space.

22. The improved optical system of claim 21, wherein at least one of the viewing optical system and the receiver optical system includes a lens having a dichroic coating on one surface, for transmitting visible and near infrared light, and for reflecting light of the wavelength transmitted by the laser emitter.

23. The improved optical system of claim 21, wherein the viewing optical system includes a pair of focusing wedges for adjusting the focus of the viewing optical system.

24. The improved optical system of claim 23, wherein each focusing wedge is a wedge shaped optical flat, the pair of focusing wedges being disposed against one another along a plane inclined with respect to the optical axis of the viewing optical system, whereby focus adjustment is achieved by relative movement between the focusing wedges along the inclined plane.

25. The improved optical system of claim 24, further including means for moving at least one of the focusing wedges with respect to the other focusing wedge along the inclined plane for changing the optical thickness of the pair of focusing wedges, and thereby adjusting the focus of the viewing optical system.

26. The improved optical system of claim 25, further including a housing for supporting the improved optical system, and wherein the means for moving at least one of the focusing wedges with respect to the other focusing wedge is a rotatable knob attached to the housing.

27. The improved optical system of claim 25, further including a housing for supporting the improved optical system, and wherein the means for moving at least one of the focusing wedges with respect to the other focusing wedge is a pivotable lever attached to the housing.

28. The improved optical system of claim 21, wherein the viewing optical system includes an image intensifier tube for permitting night vision.

29. A night vision goggle and rangefinder, comprising:
   a housing;
   a laser emitter having an optical axis supported within the housing;
   a laser detector supported within the housing;
   a transmitter optical system having an optical axis supported within the housing;
   a receiver optical system having an optical axis supported within the housing;
   a viewing optical system having an optical axis supported within the housing, wherein the optical axes of the transmitter optical system, the receiver optical system, and the viewing optical system are coaxial in object space;
   an image intensifier tube included within the viewing optical system for permitting night vision;
   a first optical element supported within the housing and having a central obscuration therein, wherein a visible image produced by the viewing optical system passes through the central obscuration of the first optical element;
   a second optical element supported within the housing and having a central obscuration therein, wherein laser energy received by the laser detector passes through the central obscuration of the second optical element;
   a third optical element supported within the housing and having a central obscuration therein, wherein laser energy transmitted by the laser emitter passes through the central obscuration of the third optical element;
   a lens having a dichroic coating on one surface in at least one of the viewing optical system and the receiver optical system, for transmitting visible and near infrared light to the image intensifier tube and for reflecting laser energy received by the receiver optical system to the laser detector; and
   a pair of focusing wedges for adjusting the focus of the viewing optical system, each focusing wedge being a wedge-shaped optical flat, the pair of focusing wedges being disposed against one another along a plane inclined with respect to the coaxial axis of the transmitter, receiver, and viewing optical systems, whereby focus adjustment is achieved by relative movement between the focusing wedges along the inclined plane.

30. The night vision goggle and rangefinder of claim 29, wherein the optical axis of the laser emitter is offset with respect to the coaxial axis of the transmitter, receiver, and viewing optical systems, and wherein the transmitter optical system includes at least one folding mirror for reflecting laser energy from the laser emitter into a path concentric with the coaxial axis of the transmitter, receiver, and viewing optical systems.

31. The night vision goggle and rangefinder of claim 29, further including means for moving at least one of the focusing wedges with respect to the other focusing wedge along the inclined plane for changing the optical thickness of the pair of focusing wedges, and thereby adjusting the focus of the viewing optical system.

32. The night vision goggle and rangefinder of claim 31, wherein the means for moving at least one of the focusing wedges with respect to the other focusing wedge is a rotatable knob attached to the housing.

33. The night vision goggle and rangefinder of claim 31, wherein the means for moving at least one of the focusing wedges with respect to the other focusing wedge is a pivotable lever attached to the housing.

* * * * *